(12) United States Patent
Neft et al.

(10) Patent No.: US 12,179,460 B2
(45) Date of Patent: Dec. 31, 2024

(54) GLAZING UNIT HAVING A METAL-BASED COATING AND A PROTECTIVE LAYER AT THE MARGIN

(71) Applicant: SAINT-GOBAIN GLASS FRANCE, Courbevoie (FR)

(72) Inventors: Anna Neft, Herzogenrath (DE);
Stephan Gillessen, Alsdorf (DE);
Stefanie Pengel, Aachen (DE);
Jefferson Do Rosario, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/549,859

(22) PCT Filed: May 16, 2022

(86) PCT No.: PCT/EP2022/063115
§ 371 (c)(1),
(2) Date: Sep. 8, 2023

(87) PCT Pub. No.: WO2022/248260
PCT Pub. Date: Dec. 1, 2022

(65) Prior Publication Data
US 2024/0149561 A1   May 9, 2024

(30) Foreign Application Priority Data
May 26, 2021  (EP) ...................... 21175938

(51) Int. Cl.
*B32B 7/12* (2006.01)
*B32B 17/10* (2006.01)
*C03C 17/36* (2006.01)

(52) U.S. Cl.
CPC .. *B32B 17/10229* (2013.01); *B32B 17/10036* (2013.01); *B32B 17/10201* (2013.01);
(Continued)

(58) Field of Classification Search
CPC ........ B32B 17/10036; B32B 17/10761; B32B 17/10293
See application file for complete search history.

(56) References Cited

U.S. PATENT DOCUMENTS

2023/0182444 A1* 6/2023 Neft .................. B32B 17/10229
428/432

FOREIGN PATENT DOCUMENTS

DE   199 27 683 C1   1/2001
DE   100 22 409 C1   4/2002
(Continued)

OTHER PUBLICATIONS

MR International Search Report as issued in International Patent Application No. PCT/EP2022/063115, dated Jul. 4, 2022.

*Primary Examiner* — Elizabeth E Mulvaney
(74) *Attorney, Agent, or Firm* — Pillsbury Winthrop Shaw Pittman LLP

(57) ABSTRACT

A glazing unit includes a first pane and a second pane, which are connected to one another via a thermoplastic intermediate layer, a metal-based functional layer, which is deposited on an internal surface of the first pane facing the thermoplastic intermediate layer, a coating-free marginal region on the internal surface of the first pane, which is free of metal-based functional layer and extends from one side edge of the first pane over at least 1 mm to at most 5 mm on the internal surface, a protective layer, which, in the coating-free marginal region, is disposed directly on the internal surface of the first pane and, in an overlap region directly adjacent to the coating-free marginal region, is disposed on the metal-based functional layer.

20 Claims, 2 Drawing Sheets

Figure 1:
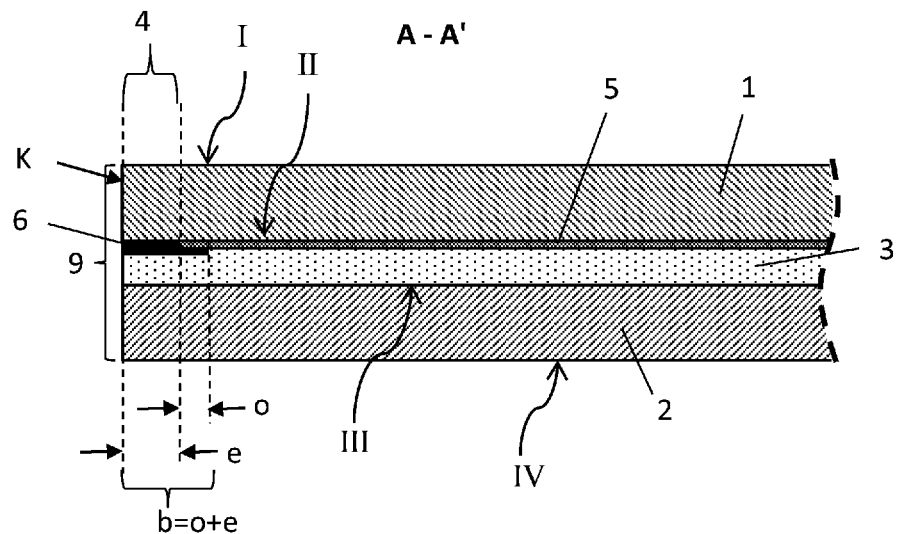

(52) U.S. Cl.
CPC .. *B32B 17/10266* (2013.01); *B32B 17/10302* (2013.01); *B32B 17/10348* (2013.01); *B32B 17/10761* (2013.01); *B32B 17/10807* (2013.01); *C03C 17/3642* (2013.01); *C03C 17/366* (2013.01); *C03C 17/3681* (2013.01); *B32B 2307/41* (2013.01); *B32B 2307/412* (2013.01); *B32B 2307/416* (2013.01); *B32B 2605/00* (2013.01); *C03C 2217/948* (2013.01); *C03C 2218/153* (2013.01)

(56) References Cited

FOREIGN PATENT DOCUMENTS

| | | |
|---|---|---|
| DE | 697 31 268 T2 | 9/2006 |
| DE | 1 917 222 B1 | 3/2009 |
| WO | JR WO A1 2007/101964 | 9/2007 |
| WO | WO 2010/043598 A1 | 4/2010 |
| WO | WO 2013/104439 A1 | 7/2013 |
| WO | WO 2013/131667 A1 | 9/2013 |

\* cited by examiner

GLAZING UNIT HAVING A METAL-BASED COATING AND A PROTECTIVE LAYER AT THE MARGIN

CROSS-REFERENCE TO RELATED APPLICATIONS

This application is the U.S. National Stage of PCT/EP2022/063115, filed May 16, 2022, which in turn claims priority to European patent application number 21175938.6 filed May 26, 2021. The content of these applications are incorporated herein by reference in their entireties.

The invention relates to a glazing unit, to a method for manufacturing the glazing unit and to its use.

Glazing units in buildings and vehicles are increasingly being provided with large-area, electrically conductive coatings that are transparent to visible light and must fulfill specific functions. Such layers are generally metal-based; i.e., they have at least one layer made of a metallic material, and are commonly referred to as functional layers.

For example, for reasons of energy-saving and comfort, high demands are placed on glazing units in terms of their thermal insulation properties. It is thus desirable to avoid high heat input from solar radiation, which leads to excessive heating of the interior and in turn results in high energy costs for the necessary air-conditioning. Particularly in the course of increasing electromobility, it is of great importance to save energy and weight, which are required for heating, ventilation and air-conditioning. It is known to provide vehicle panes with transparent electrically conductive coatings. These are typically electrically conductive coatings with IR-reflective properties that improve thermal comfort in the vehicle interior. In particular, a distinction must be made between sun-protection coatings and emissivity-reducing coatings (low-E coatings). Sun-protection coatings reflect portions of the sun's radiation in the near-infrared spectrum and prevent it from entering and heating the vehicle interior. They typically have one or more silver layers providing the IR-reflective properties, as known for example from WO2013/104439A1 and from DE 19927683C1. Emissivity-reducing coatings (so-called low-E coatings) reflect radiation in a more distant IR range, in particular the thermal radiation emitted by a heated glass pane. The penetration of thermal radiation into the vehicle interior is reduced, which also results in less heating of the interior. In winter, when the outside temperature is low, the heat of the interior is prevented from radiating to the outside environment. Transparent emissivity-reducing coatings may contain, for example, reflective layers based on indium tin oxide (ITO) or other transparent conductive oxides (TCO), as known, for example, from WO2013/131667A1.

Another application of functional coatings is aimed at keeping the field of vision of a vehicle windshield free of ice and fogging. Electrical heating layers that cause targeted heating of the vehicle pane by applying a voltage (see, for example, WO 2010/043598 A1) are known. DE 10022409C1 shows a metallic functional layer that is protected against corrosion in a marginal region by means of a protective layer, for example an opaque ceramic stoving ink.

In the case of composite panes, which are composed of two individual panes with a thermoplastic intermediate layer between them, a metal-based functional layer is often disposed between the two individual panes. The metal-based functional layer is thus well-protected against weathering and mechanical damage. However, if the metal-based functional layer is exposed at the margin of the pane (pane edge), severe corrosion of the metal-based functional layer often occurs. To prevent such corrosion, it is usual to decoat the marginal region of a pane. As a rule, decoating is carried out in a range of approximately 8 mm to 10 mm measured from the pane edge. This distance ensures that there is no diffusion of moisture through the thermoplastic intermediate layer to the metal-based functional layer, which would lead to corrosion there. The decoating edge can be seen in the finished composite pane, since the transition from the decoated region to the metal-based functional layer is visible. If this marginal region of the pane is in the visible range in the installed state, this will be visually highly disturbing.

In contrast, the object of the present invention is to provide an improved composite pane with a metal-based functional layer that can avoid these disadvantages, wherein the essential aim is to protect the metal-based functional layer from corrosion while at the same time avoiding the visual disadvantages of a wide margin decoating. Vision through the glazing unit should not be restricted more than necessary. The glazing unit with pane and metal-based functional layer should be easy and cost-effective to manufacture in industrial large-scale production. In addition, the method for manufacturing the glazing unit should be easy and inexpensive to use in common manufacturing methods for panes.

According to the invention, this object is achieved by a glazing unit according to claim 1. A manufacturing method and use of the glazing unit are apparent from further claims. Preferred embodiments are apparent from the subclaims.

The glazing unit according to the invention comprises a first pane and a second pane, which are connected to one another by a thermoplastic intermediate layer. The first pane has an external surface (I) facing the external environment and an internal surface (II) facing the thermoplastic intermediate layer and a circumferential side edge. The second pane also has an internal surface (III) facing the thermoplastic intermediate layer and an external surface (IV) facing the outer environment, along with a circumferential side edge. Accordingly, the terms "internal" and "external" refer to the arrangement of the respective surfaces in the composite glazing unit.

A metal-based functional layer is disposed between the first pane and the second pane, such that it is protected from weathering and mechanical damage. The metal-based functional layer is disposed on the internal surface of the first pane facing the thermoplastic intermediate layer. On the internal surface of the first pane, there is a coating-free marginal region, which extends from the side edge up to 5 mm over the internal surface. No metal-based functional layer is disposed in this coating-free marginal region. The metal-based functional layer begins directly adjacent to the coating-free marginal region. The term "marginal region" refers to a surface area on the internal surface of the first pane, which is disposed at the margin of the pane. The marginal region of the pane extends to the side edge of the pane.

A protective layer to protect the metal-based functional layer from corrosion is disposed in the coating-free marginal region on the internal surface of the first pane. The protective layer is also disposed, preferably directly disposed, in an overlap region on the metal-based functional layer. The overlap region is directly adjacent to the coating-free marginal region, such that there is no gap between the metal-based functional layer and the protective layer, which would otherwise promote the corrosion of the metal-based functional layer. It is essential that the protective layer and the metal-based functional layer are disposed overlapping in the overlap region; i.e., that they lie on top of one another as seen vertically through the pane. In this way, the corrosion-induced degradation of the metal-based functional layer can be significantly reduced. Preferably, the protective layer is not applied over the entire surface of the first pane, but only over part of the pane.

The protective layer is applied to the internal surface of the first pane in the coating-free marginal region. The protective layer can be applied there directly, i.e. immediately, to the first pane, although it is equally possible for at least one further layer made of a material different from the protective layer to be disposed between the protective layer and the pane. The protective layer is preferably disposed directly, i.e. immediately, on the metal-based functional layer in the overlap region. It is equally possible that at least one further layer made of a material different from the protective layer is disposed between the protective layer and the metal-based functional layer.

The protective layer and the metal-based functional layer may each consist of a single layer or a ply of the same material, although it is equally possible for each to consist of a plurality of individual layers or plies of at least two different materials. The protective layer and the metal-based functional layer may thus each consist of a single layer or ply of the same material. Alternatively, the protective layer and the metal-based functional layer may each consist of a plurality of individual layers or plies of at least two different materials. It is common practice for a metal-based functional layer to take the form of a layer system consisting of different individual layers.

Preferably, the protective layer extends from 3 mm to 15 mm on the first pane, measured from the side edge of the first pane. The protective layer thus overlaps the metal-based functional layer in an overlap region of at least 2 mm width, which ensures protection against corrosion, and at the same time the protective layer is not noticeable in a disturbing manner in the installed state. The distance to the side edge or the width of a region is measured in the plane of the surface of the pane. The distance is always the shortest possible connection between the side edge and the corresponding region. Particularly preferably, the protective layer extends from the side edge of the first pane over 4 mm to 12 mm, very preferably over 5 mm to 10 mm of the surface of the first pane. This prevents the transition from the metal-based functional layer to the protective layer from having a disturbing effect on the overall visual impression of the pane, since it is located at the outer edge of the glazing unit.

Preferably, the coating-free marginal region on the internal surface extends over 1 mm to 4 mm, particularly preferably over 2 mm to 3 mm. Such a narrow marginal region is surprisingly sufficient for achieving adequate corrosion protection for the metal-based functional layer in combination with the protective layer disposed above it.

The glazing unit according to the invention comprises a circumferential pane edge. The pane edge is composed of the two side edges of the first pane and the second pane and a thermoplastic intermediate layer disposed between them.

In a preferred embodiment, the coating-free marginal region and the protective layer are preferably disposed in sections along the circumferential pane edge. In particular, the section or sections provided with the arrangement according to the invention correspond to the visible, exposed sections in the installed state. In the case of a free-standing vehicle side pane, for example, these are the upper edge section facing the roof of the vehicle and the side edge sections. In the case of an opening vehicle side pane, this is the upper edge section facing the roof. The design according to the invention is also particularly advantageous at the side pane edges, which are disposed in a guide, since the guide covers only a small region of the margin of the glazing unit, such that here a coating-free marginal region disposed as close as possible to the side edge is visually advantageous. Along the remaining sections, which are hidden by frames or masking strips in the installed state, a wider margin decoating can be applied as corrosion protection, since the transition from the metal-based functional layer to the decoated region is then no longer visible in the installed state.

In an alternative preferred embodiment, the coating-free marginal region and the protective layer extend circumferentially along the entire circumferential pane edge. This provides good corrosion protection and is visually advantageous, as well as easy to manufacture depending on the type of decoating.

The protective layer is preferably applied in strip-like form and is preferably in the form of a strip with a constant width in an edge section. This is easy to manufacture in terms of process technology and is visually advantageous compared to a strip with a changing width. The same applies to the design of the coating-free marginal region.

The glazing unit comprises a first pane having a metal-based functional layer and a protective layer on an internal face. It is also possible to provide the second pane or both panes with a metal-based functional layer and a protective layer on the internal face.

In a preferred embodiment, the protective layer is an enamel. In principle, the protective enamel layer can be applied to the pane by any suitable method. Preferably, the protective layer is applied to the pane by brushing, rolling, spraying or printing, preferably by means of screen printing or digital printing. These are common methods in the industrial large-scale production of panes and allow the protective coating to be applied quickly and evenly to the pane. Preferably, the protective enamel layer is applied using a screen-printing method or a digital printing method. Such printing methods enable the particularly precise application of the protective layer. The enamel is usually formed from silicates and/or oxides, which are transferred to the coating by melting, fritting or sintering. Here the enamel mixture, usually in the form of a powder or paste, sometimes with additives, is applied to the substrate and melted, usually at high temperatures and with short stoving times, forming the enamel after solidification. Such enamel coatings are common in the field and known to the skilled person.

In a preferred embodiment, the protective layer is an opaque enamel or a transparent enamel. The advantage of an opaque enamel is that the transition between the metal-based functional layer and the coating-free marginal region is completely concealed, at least in the viewing direction of the opaque enamel. Depending on the installation position, this can be the viewing direction from the interior or from the outside. The advantage of a transparent enamel is that it is less obtrusive along an exposed pane edge than is an opaque enamel and, at the same time, makes the transition between metal-based functional layer and coating-free marginal region somewhat less disturbing.

Within the meaning of the present invention, "transparent" means that the overall transmittance of the pane and, in particular, of the glazing unit complies with the legal requirements for windshields and front side panes and preferably has a transmittance for visible light of more than 70% and, in particular, of more than 75%. For rear side panes and rear panes, "transparent" can also mean 15% to 70% light transmission. Accordingly, "opaque" means a light transmission of less than 15%, preferably less than 5%, in particular 0%.

In a preferred embodiment, the transparent or opaque enamel contains glass frits and/or mineral frits. Preferably, the enamel contains glass frits and/or mineral frits based on oxides selected from boron, bismuth, zinc, silicon, aluminum and sodium, thus achieving the technical advantage that corrosion of the metal-based functional layer can be suppressed particularly effectively. For example, frit compositions of $ZnO$, $B_2O_3$ and $SiO_2$ or of $ZnO$, $B_2O_3$, $SiO_2$, $Al_2O_3$ and $Na_2O$ are preferred, resulting in long-lasting imprintments. Particularly preferred are compositions of $ZnO$, $B_2O_3$, $SiO_2$, $Bi_2O_3$ and $Na_2O$ or of $ZnO$, $B_2O_3$, $SiO_2$, $Bi_2O_3$, $Na_2O$ and $Al_2O_3$, which result in even more durable imprintments. Compositions of $Na_2O$, $Bi_2O_3$ and $SiO_2$ have proven to be particularly good. In order to obtain an imprintable paste, at least solvent (for example, 15-25% by weight based on the printing paste) and some (3-5% by weight based on the printing paste) polymeric resin are added to each of the glass frits and mineral frits.

In the case of an opaque enamel, it still contains at least one pigment. The enamel can contain other chemical compounds. The glass frits and mineral frits may be melted or fused and the protective layer can thus be permanently connected (fused or sintered) to the glass surface. The optional pigment provides the opacity of the protective layer. Pigments typically suitable are a black pigment, for example pigment carbon black, aniline black, bone black, iron oxide black, spinel black and/or graphite. Preferably, the enamel does not react with the underlying metal-based functional layer; i.e., the enamel application in the coating-free region looks the same as in the overlap region. This is particularly advantageous visually.

Preferably, the protective enamel layer has a thickness of 4 μm to 40 μm, preferably of 5 μm to 25 μm, whereby effective inhibition of corrosion can be achieved.

In another preferred embodiment, the protective layer is a transparent oxide-containing coating, which is applied as a SolGel layer, a PVD (physical vapor deposition) layer or a CVD (chemical vapor deposition) layer, preferably an APD (atmospheric plasma deposition) layer. The oxide-containing transparent coating effectively protects the metal-based functional layer from corrosion and, in particular, is stable even after heat treatment of the pane, and does not interact with the underlying metal-based functional layer. The use of a transparent coating maintains visibility through the glazing unit. Depending on the application, this can be a great advantage for the pane.

The oxide-containing coating can contain an oxide of at least one element selected from aluminum, silicon, titanium, zinc, zirconium, or tin, wherein an oxide of silicon or silicon oxide is preferred.

In a particularly preferred embodiment, the oxide-containing coating is a so-called SiOxCyHz layer (oxides of silicon with a variable hydrocarbon content), which can be formed, for example, by plasma polymerization of HMDSO. The stoichiometric composition depends, for example, on the deposition conditions. According to a preferred embodiment of the present invention, the APD coating is preferably an organosilicon layer (SiOxCyHz), which can be obtained by injecting hexamethyldisiloxane (HMDSO) as a liquid precursor into the plasma nozzle.

For example, the oxide-containing coating can contain or consist of at least 40% by weight, at least 50% by weight, or at least 60% by weight, or at least 80% by weight, or at least 90% by weight of oxide, wherein it comprises layers that contain impurities without affecting their properties. Here oxide means in particular $SiO_2$ and also SiOxCyHz (including the organic part).

The oxide-containing coating preferably has a thickness of at least 20 nm, more preferably at least 30 nm, particularly preferably at least 40 nm, for example in the range of 20 nm to 2 μm, preferably 30 nm to 1 μm, more preferably 40 nm to 500 nm and particularly preferably 80 nm to 300 nm.

In a preferred embodiment, the protective layer (enamel or transparent oxide-containing protective layer) is in direct contact with the thermoplastic intermediate layer. This means that no further material layer is disposed between the thermoplastic intermediate layer and the protective layer. This prevents material incompatibilities that could lead to visual disadvantages in the region of the pane edge.

In principle, the metal-based functional layer can be formed in any way. Preferably, the coating is electrically conductive and transparent to visible light, comprising at least one layer of a metal.

The metal-based functional layer is preferably applied to the pane over a large area. The metal-based functional layer is disposed at least on the internal surface of the first pane and covers or overlaps the surface of the first pane completely or partially, but preferably over a large area. The term "large area" means that at least 50%, at least 60%, at least 70%, at least 75% or preferably at least 90% of the surface of the pane is covered by the functional layer. However, the functional layer can also extend over smaller portions of the surface of the pane.

The metal-based functional layer is a single layer or a layer structure consisting of a plurality of individual layers with a total thickness of, for example, less than or equal to 2 μm, preferably less than or equal to 1 μm. Advantageously, the metal-based functional layer has a thickness of 80 nm to 1000 nm, in particular of 80 nm to 600 nm, preferably of 120 nm to 400 nm.

Preferably, the metal-based functional layer is a sun-protection layer with reflective properties in the infrared range and thus in the range of solar radiation, whereby heating of the interior of a building or motor vehicle as a result of solar radiation is advantageously reduced. Functional layers with a sun-protection effect are well-known to the skilled person and typically contain at least one metal, in particular silver or an alloy containing silver. The layer with sun-protection effect can comprise a sequence of a plurality of individual layers, in particular at least one metallic layer and dielectric layers, which contain, for example, at least one metal oxide. The metal-based functional layer is particularly well-protected against corrosion by the margin decoating according to the invention in combination with the protective layer.

Preferably, the metal-based functional layer contains at least one metal layer, for example, of silver, nickel, chromium, niobium, tin, titanium, copper, palladium, zinc, gold, cadmium, aluminum, silicon, tungsten or alloys thereof. The metal-based functional layer preferably comprises a metal layer such as a silver layer or a silver-containing metal alloy layer. Typical silver layers preferably have thicknesses of 5 nm to 18 nm, particularly preferably 8 nm to nm. The metal layer can be sandwiched between at least two layers of dielectric material of the metal oxide type. The metal oxide preferably includes zinc oxide, tin oxide, indium oxide, titanium oxide, silicon oxide, aluminum oxide or the like, along with combinations of one or more thereof. The dielectric material preferably contains silicon nitride, silicon carbide, aluminum nitride along with combinations of one or more thereof. Such metal-based functional coatings with a sun-protection effect are known, for example, from WO 2007/101964 A1, DE 19927683 C1 (both low-E and sun protection), EP 1917222 B1 and DE69731268T2.

For example, the metal-based functional layer has a sheet resistance from 0.1 ohm/sq to 200 ohm/sq, more preferably from 1 ohm/sq to 50 ohm/sq and most preferably from 1 ohm/sq to 10 ohm/sq.

The thickness of a metal-based functional layer with a sun-protection effect can vary widely and can be adapted to the requirements of the individual case, wherein a layer thickness of 10 nm to 5 µm and, in particular, 30 nm to 1 µm is preferred.

The metal-based functional layer can also be an electrically heatable layer, for example, through which the pane is provided with a heating function. Such heatable layers are known to the skilled person per se. They typically contain one or more, for example, two, three or four electrically conductive layers. Such layers preferably contain or consist of at least one metal, for example silver, gold, copper, nickel and/or chromium, or a metal alloy and preferably contain at least 90% by weight of the metal, in particular at least 99.9% by weight of the metal. Such coatings exhibit particularly advantageous electrical conductivity with simultaneous high transmission in the visible spectral range. The thickness of a single layer is preferably from 5 nm to 50 nm, more preferably from 8 nm to 25 nm. With such a thickness, an advantageously high transmission in the visible spectral range and a particularly advantageous electrical conductivity are achieved. Such metal-based functional layers are particularly well-protected against corrosion by the arrangement according to the invention.

In a preferred embodiment of the glazing unit according to the invention, the glazing unit comprises an emissivity-reducing coating in addition to the metal-based functional layer. The emissivity-reducing coating is an electrically conductive transparent coating. The emissivity-reducing coating can also be referred to as a thermal-radiation reflective coating, low-emissivity coating, or low-E (low-emissivity) coating. Such coatings are known, for example, from WO2013/131667A1. Emissivity is the measure that indicates how much heat radiation the pane emits into an interior in the installed position compared to an ideal heat emitter (a black body). The function of the emissivity-reducing coating is to prevent heat from entering the interior (IR components of solar radiation and, in particular, thermal radiation from the pane itself) and also to prevent heat from radiating out of the interior. It has reflective properties against infrared radiation, particularly against thermal radiation in the spectral range of 5 µm-50 µm (see also the standard DIN EN 12898:2019-06). This effectively improves thermal comfort in the interior. At high outside temperatures and solar radiation, the emissivity-reducing coating can be particularly effective in at least partially reflecting the heat radiation radiated by the entire pane in the direction of the interior. At low outdoor temperatures, the emissivity-reducing coating can effectively reflect heat radiation emitted from the interior, reducing the effect of the cold pane as a heat sink.

The emissivity-reducing coating preferably contains at least one electrically conductive layer based on a transparent conductive oxide, which provides reflective properties in relation to thermal radiation. The layer based on the transparent conductive oxide is also referred to below as the TCO layer. TCO layers are corrosion-resistant and may be used on exposed surfaces. The TCO layer is preferably formed on the basis of indium tin oxide (ITO), but can alternatively be formed on the basis of indium zinc mixed oxide (IZO), aluminum-doped zinc oxide (AZO), gallium-doped zinc oxide (GZO), fluorine-doped tin oxide (FTO, $SnO_2$:F) or antimony-doped tin oxide (ATO, $SnO_2$:Sb). The emissivity-reducing coating preferably does not contain a metal-based metallic layer. For this reason, the emissivity-reducing coating is not susceptible to corrosion.

Preferably, the first pane and/or the second pane contains an emissivity-reducing coating on an external surface. Preferably, the emissivity-reducing coating is disposed over the entire external surface. Particularly preferably, the emissivity-reducing coating is disposed on the external surface of the second pane.

The metal-based functional layer and the emissivity-reducing coating are deposited by methods known per se, for example by magnetic-field-assisted cathode sputtering, which is particularly advantageous in terms of the simple, fast, cost-effective and uniform coating of the pane. Sputtering takes place in an inert gas atmosphere, for example of argon, or in a reactive gas atmosphere, for example by adding oxygen, a hydrocarbon (for example methane) or nitrogen. However, the functional layer can also be applied by other methods known to the skilled person, for example by vapor deposition or chemical vapor deposition (CVD), by atomic layer deposition (ALD), by plasma-enhanced chemical vapor deposition (PECVD) or by wet chemical methods.

In an advantageous embodiment, the first and/or second pane contains or consists of non-tempered, partially tempered or tempered glass, preferably flat glass, float glass, quartz glass, borosilicate glass, soda-lime glass. Alternatively, the panes contain or consist of clear plastics, preferably rigid clear plastics, particularly polyethylene, polypropylene, polycarbonate, polymethyl methacrylate, polystyrene, polyamide, polyester, polyvinyl chloride and/or mixtures thereof. Suitable glasses are known, for example, from EP 0847965 B1.

The thickness of the first and second panes may vary widely and may be adapted to the requirements of the individual case. For example, panes with a standard thickness of 1.0 mm to 25 mm are used. For example, the thickness is from 0.5 mm to 15 mm, particularly from 1 mm to 5 mm. For vehicle glazing units, for example, panes with a thickness of 1.4 mm to 2.5 mm are used, for example, with the standard thicknesses of 1.6 mm or 2.1 mm. The size of the pane can vary widely and depends on the application.

The glazing unit, and thus the first pane and the second pane, may have any three-dimensional shape. Preferably, the panes are planar or slightly or strongly curved in one direction or in a plurality of spatial directions.

The first pane, the second pane and the thermoplastic intermediate layer may be independently clear and colorless, tinted or colored.

The thermoplastic intermediate layer contains at least one thermoplastic polymer, preferably ethylene vinyl acetate (EVA), polyvinyl butyral (PVB) or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, more preferably from 0.3 mm to 1 mm.

The glazing unit according to the invention is preferably curved in one or more spatial directions, as is common for motor vehicle panes, with typical radii of curvature in the range of approximately 10 cm to approximately 40 m. However, the glazing unit can also be planar, for example, if it is provided as a pane for buses, trains or tractors.

In a preferred embodiment, the glazing unit is a vehicle pane, preferably a motor vehicle pane. The vehicle pane is provided to separate the interior from the external environment in a window opening of a vehicle. For the purposes of the invention, the term "inner pane" refers to the pane of the vehicle pane facing the vehicle interior. "Outer pane" refers to the pane facing the external environment. Preferably, the glazing unit is a side pane of a motor vehicle, preferably an opening side pane or a free-standing side pane, since the visually improved margin of the pane is particularly advantageous here.

In a preferred embodiment of the motor vehicle pane, the first pane is the outer pane and the second pane is the inner pane of the vehicle. Preferably, the metal-based functional coating is a sun-protection coating or a heatable coating with at least one metallic layer, preferably a silver layer. By attaching them to the outer pane, such coatings may work effectively, since the sun is reflected directly off the outer pane, or the outer pane can be heated and de-iced. Alternatively preferably, the first pane is the inner pane and the second pane is the outer pane of the vehicle.

Particularly preferably, the first pane is the outer pane and the metal-based functional layer is a sun-protection coating and, in addition, an emissivity-reducing coating is disposed on the external surface of the inner pane (second pane). The emissivity-reducing coating combined with the sun-protection coating maximizes comfort for the vehicle occupant.

If a first layer is disposed above a second layer, within the meaning of the invention this means that the first layer is disposed further away from the substrate on which the coating is applied than is the second layer. If a first layer is disposed below a second layer, within the meaning of the invention, this means that the second layer is disposed further away from the substrate than is the first layer.

The invention further extends to a method for manufacturing the glazing unit according to the invention. The above statements in connection with glazing unit apply equally to the method according to the invention and vice versa.

The method comprises providing a first pane, a second pane and a thermoplastic intermediate layer.

The method further comprises the application of a metal-based functional layer to the surface of the first pane provided as an internal surface. The metal-based functional layer is preferably applied in a vacuum-based coating method. Suitable vacuum-based coating methods are, for example, CVD (chemical vapor deposition) or PVD (physical vapor deposition), preferably cathode sputtering ("sputtering"), particularly preferably by magnetic field-assisted cathode sputtering ("magnetron sputtering") and known to the skilled person. The metal-based functional coating is usually deposited over the entire surface of the first pane, which is intended to be the internal surface. If necessary, the first pane can be provided with one or more precoatings prior to the application of the metal-based functional layer. However, it is preferred that the metal-based functional layer be applied directly to the uncoated pane.

The method further comprises removing the metal-based functional layer in a circumferential region, which extends from one side edge of the first pane for at least 1 mm to at most 5 mm. This marginal region is realized in the finished glazing unit as a coating-free marginal region. The functional layer can be removed in various ways, preferably by means of laser processing, abrasively by mechanical decoating (preferably a grinding method), by using a mask during the application of the functional layer or by prior application of a sacrificial layer, which is decomposed in a downstream process step at elevated temperature and removed together with the functional layer. It is particularly preferred to remove the functional layer by means of laser processing, since this achieves particularly good results in the narrow marginal region of at most 5 mm width according to the invention.

The method further comprises the application of a protective layer in an overlap region directly adjoining the coating-free marginal region on the metal-based functional layer and in the coating-free marginal region directly on the surface of the first pane provided as an internal surface.

The method further comprises a temperature treatment of the first pane at temperatures from 400° C. to 700° C., preferably from 550° C. to 650° C. Here the protective layer is stoved on and bonds to the first pane. For curved glazing units, such heat treatment is preferably carried out as part of the bending step of the pane. Preferably, the first and second panes are bent together (i.e., simultaneously and by the same tool) in a congruent manner, because this ensures that the shape of the panes is optimally matched for the lamination that takes place later.

The method according to the invention further comprises connecting the first pane and the second pane via the thermoplastic intermediate layer. The first pane and the second pane are thereby connected to one another so that the internal surface of the first pane faces the thermoplastic intermediate layer.

Accordingly, the method for manufacturing a glazing unit according to the invention preferably serves to manufacture a composite pane. For the manufacture of a composite pane, at least two panes are preferably connected (laminated) to one another under the action of heat, vacuum and/or pressure by at least one thermoplastic adhesive layer. Methods known per se may be used to manufacture a composite pane. For example, so-called autoclave methods may be carried out at an elevated pressure of approximately 10 bar to 15 bar and temperatures of 130° C. to 145° C. for approximately 2 hours. Vacuum-bag or vacuum-ring methods known per se operate, for example, at approximately 200 mbar and 130° C. to 145° C. The two panes and the thermoplastic intermediate layer may also be pressed in a calender between at least one pair of rollers to form a composite pane. Installations of this type for the manufacture of composite panes are known and usually have at least one heating tunnel upstream of a pressing unit. The temperature during the pressing process, for example, ranges from 40° C. to 150° C. In practice, combinations of calendering and autoclaving methods have proved particularly successful. Alternatively, vacuum laminators may be used. These consist of one or more chambers that can be heated and evacuated, in which the first pane and the second pane may be laminated within, for example, approximately 60 minutes at reduced pressures of 0.01 mbar to 800 mbar and temperatures of 80° C. to 170° C.

In a preferred embodiment, the protective layer is an enamel. The protective layer is preferably printed onto the glass pane, in particular by screen printing. The printing ink is thereby printed through a fine-mesh fabric onto the glass pane. The printing ink is pressed through the fabric with a rubber squeegee, for example. The fabric has regions that are permeable to the printing ink next to regions that are impermeable to the printing ink, thereby defining the geometric shape of the print. The fabric thus acts as a template for the print. Alternatively preferably, the printing ink is printed using a digital printing method. The printing ink is thereby applied directly to the substrate via nozzles.

The printing ink contains at least the glass frits and/or mineral frits and, in the case of an opaque enamel, at least one pigment suspended in a liquid phase (solvent), for example water or organic solvents such as alcohols. The pigment is typically a black pigment, such as pigment carbon black, aniline black, bone black, iron oxide black, spinel black and/or graphite.

After the imprinting of the printing ink, it is at least partially stoved on. The at least partial stoving on is preferably carried out at a temperature of 450° C. to 700° C., in particular 550° C. to 650° C. The protective enamel layer can be pre-stoved on (partially stoved on) or fully stoved on. Pre-stoving in is understood to be a temperature treatment with which the liquid phase is expelled by evaporation and the frits are melted and then form a certain bond with one another and with the surface of the glass pane. If the imprintment contains other chemical compounds, these typically are already undergoing reactions or other transformations, such as crystallization. As such, pre-stoving is typically accompanied by a change in the color of the imprintment, although the color after pre-stoving can already correspond to the color of the final stoved-on enamel. What remains as the enamel is the glass matrix or ceramic matrix formed by the frits with the optionally included pigment along with any other additives that are typically the product of chemical reactions during stoving. The final stoving, during which the final structure of the enamel and the final connection to the pane surface is created, preferably takes place during the bending of the glass pane. This means that one method step can be dispensed with.

In another preferred embodiment, the protective coating is an oxide-containing coating applied by means of SolGel coating, PVD coating, CVD coating, plasma-enhanced PVD coating or plasma-enhanced CVD coating. Such methods may be efficiently integrated into the industrial manufacturing process.

Preferably, the oxide-containing coating is applied by atmospheric plasma deposition (APD). The advantage of such technology is that it is possible to deposit a protective layer in a controlled manner at the precise place where protection is needed, particularly in the relatively narrow region along the edge of the glazing unit. Another advantage of APD is that it enables rapid deposition of the protective layer at high speed (several m/min). The exact local deposition of the protective layer is possible without masking technology.

Atmospheric plasma deposition is a well-known method. Here a plasma at atmospheric pressure or normal pressure is used. Preferably, plasma-enhanced chemical vapor deposition (PECVD) at atmospheric pressure is used as the atmospheric plasma deposition method. In order to convert a gas into the plasma state, a sufficiently large number of free charge carriers must be generated. The very high energy required for this can be provided in various ways.

With an electric arc plasma (arc discharge), for example, this is induced, for example, by applying a high electrical voltage between two electrodes. There are atmospheric pressure plasma sources that use an electric arc to activate gases. The electric arc can be generated linearly between two electrodes over several centimeters, for example, and process gases can flow around it.

Atmospheric pressure plasma jets are a preferred plasma source. With such devices, a plasma is generated inside the device and transported by a flow out of the plasma jet into the surrounding atmosphere.

Atmospheric pressure plasma jet systems are sold commercially by, for example, Plasmatreat GmbH, Steinhagen, Germany (for example, FG5001 and FG5005). Atmospheric pressure plasma jet systems typically feature a generator, transformer and nozzle. The nozzle forms the actual plasma jet.

With atmospheric plasma deposition, particularly PECVD at atmospheric pressure, chemical compounds are introduced into the plasma as precursors. Precursors are materials from which the desired coatings are formed in the plasma via electron collisions and chemical reactions.

The oxide-containing protective layer can contain an oxide of at least one element selected from aluminum, silicon, titanium, zinc, zirconium or tin, wherein an oxide of silicon or silicon oxide is preferred.

With atmospheric plasma deposition, the precursors used are corresponding compounds, in particular organic compounds, of aluminum, silicon, titanium, zinc, zirconium or tin, wherein an organic group-containing silane or an organic group-containing siloxane is preferred.

Examples of preferred precursors include, in particular, hexamethyldisiloxane (HMDSO), tetramethylsilane (TMS) and tetraethoxysilane (TEOS), wherein HMDSO is preferred. Oxides of silicon with a variable hydrocarbon content ($SiO_2$:CH) or quartz-like $SiO_2$ layers may thus be deposited as oxide-containing protective layers.

In a preferred embodiment, the application speed of the APD is 10 to 500 mm/s.

The glazing unit according to the invention is preferably used in buildings, in particular in the access or window region, as a built-in part in furniture and appliances, or in means of transport for traffic on land, in the air or on water, in particular in trains, ships and motor vehicles, for example as a windshield, rear pane, side pane and/or roof pane. The glazing unit is particularly preferred for use in motor vehicles, most preferably as a side pane.

The various embodiments of the invention may be implemented individually or in any combination. In particular, the features mentioned above and to be explained below can be used not only in the combinations indicated, but also in other combinations or on their own, without leaving the scope of the present invention.

In the following, the invention is explained in more detail with the aid of a drawing and exemplary embodiments. The drawing is a schematic representation and is not to scale. The drawing does not limit the invention in any way.

Figures 2A, 2B:
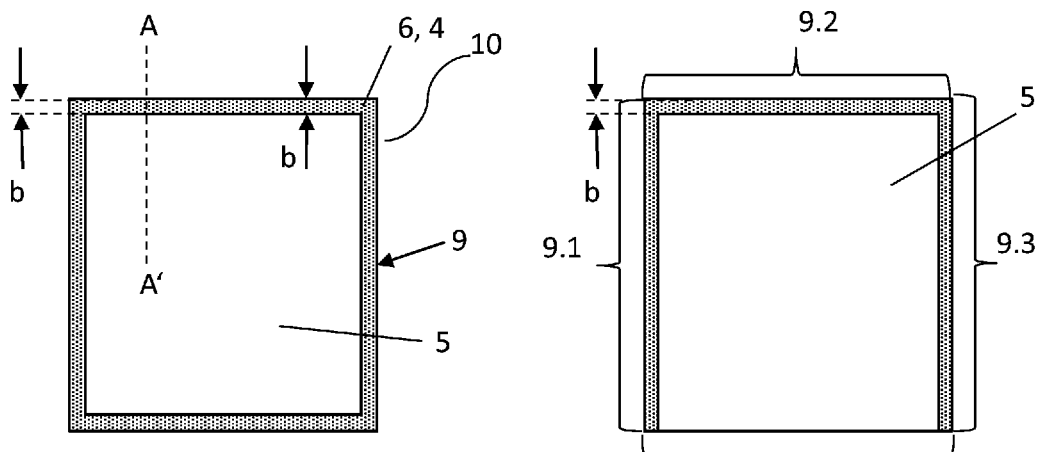
Figure 3:
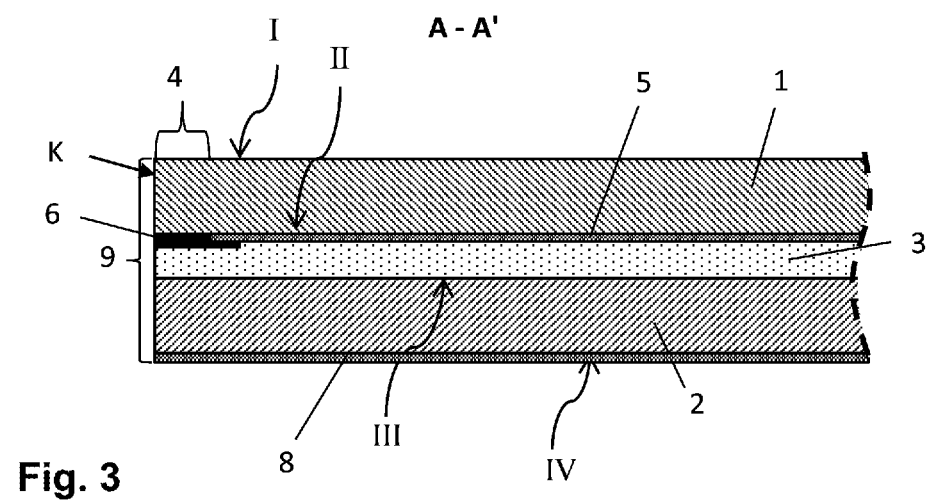

The following is shown:

FIG. 1 a cross-section through the glazing unit of FIG. 2*a* along the line A-A', FIGS. 2*a, b* in each case a top view of an embodiment of glazing unit according to the invention, FIG. 3 a cross-section through a further embodiment of a glazing unit according to the invention, FIGS. 4*a*-4*d* cross-sections of the embodiment of the glazing unit 10 according to the invention shown in FIG. 1 during various stages of its manufacture.

FIG. 2 shows a top view of an embodiment of a glazing unit 10 according to the invention, and FIG. 1 shows a cross-section of FIG. 2*a* along the section line A-A'.

As can be seen from FIGS. 1 and 2, in the embodiment shown in FIGS. 1 and 2, the glazing unit 10 according to the invention has a first pane 1 having an internal surface II and an external surface I and a circumferential side edge surface K. The glazing unit 10 comprises a second pane 2 having an internal surface III and an external surface IV and a circumferential side edge. The first pane 1 is connected to the second pane 2 via a thermoplastic intermediate layer 3. The internal surface II of the first pane 1 and the internal surface III of the second pane 2 face the thermoplastic intermediate layer 3.

For example, the first pane 1 is made of soda-lime glass and has a thickness of 2.1 mm. The second pane 2 is made of soda-lime glass, for example, and has a thickness of 1.6 mm. The thermoplastic intermediate layer 3 is formed, for example, from a 0.76 mm thick PVB film.

The first pane 1 preferably represents the outer pane and the second pane 2 represents the inner pane of the glazing unit formed as a composite pane. This arrangement is particularly advantageous due to the position of the metal-based functional layer 5 with sun-protection function on the first pane 1, since the inner pane 2 heats up less, resulting in less heating of the interior. Alternatively, the first pane 1 can be the inner pane and the second pane 2 can be the outer pane.

A metal-based functional layer 5 is disposed on the internal surface II of the first pane 1. For example, the metal-based functional layer 5 is an IR radiation-reflective coating with three conductive silver layers and dielectric layers disposed between them, and has a total thickness of approximately 280 nm. The metal-based functional layer 5 is disposed on the entire internal surface II of the first pane 1, with the exception of a coating-free marginal region 4 of width e. In this coating-free marginal region 4, the metal-based functional layer 5 has been removed or not applied. This marginal region 4 without a coating ensures that corrosion of the metal-based functional layer 5 does not occur. If the metal-based functional layer 5 were to extend to the side edge K, moisture that can penetrate in the region of the pane edge 9 could lead to corrosion. In order to prevent this, the coating-free marginal region 4 is free of functional layer 5 according to the invention. The width of the coating-free marginal region 4 is measured from the side edge K of the first pane 1 and is e=2 mm, for example.

Such a narrow coating-free marginal region alone cannot protect against corrosion in the region of the pane edge, since moisture diffuses via the thermoplastic intermediate layer 3 to the metal-based functional layer 5, where it leads to corrosion of the metal-based functional layer 5. This was investigated in laboratory tests using salt water treatment.

According to the invention, the glazing unit 10 comprises a protective layer 6 that is disposed throughout the coating-free marginal region 4. The protective layer 6 is also disposed on the metal-based functional layer 5 in the overlap region 7 with a width o of, for example, 3 mm. The overlap region 7 is disposed directly adjacent to the coating-free marginal region 4, such that the protective layer covers the transition from coating-free marginal region 4 to metal-based functional layer 5. For example, the protective layer 6 is a transparent oxide-containing coating formed from an oxide of silicon, such as a 30 nm thick SiOxCyHz layer, which was deposited by means of APD. Surprisingly, treatment with salt water in the laboratory test showed that the application of the protective coating 6 effectively prevented corrosion of the metal-based functional coating, even though the coating-free marginal region 4 was only 2 mm wide. Compared to conventional glazing units, the glazing unit according to the invention thus offers the advantage that a margin decoating of a metal-based functional layer between the panes of a composite pane only has to be carried out over a small width. This is particularly advantageous for panes whose edge region is not covered by wide frames or cover imprintments in the installed states. Thanks to the transparent oxide-containing coating, this solution is also very suitable for free-standing edges.

FIG. 2a and FIG. 2b show two possible embodiments of a glazing unit according to the invention in a top view.

FIG. 2a shows a pane with a coating-free marginal region 4 and a protective layer 6 of width b in frame form, which are configured along the entire circumferential pane edge 9 according to the present invention. Details regarding the embodiment of the marginal region can be found in the description of FIG. 1. One advantage of this design is that the pane is protected all around from corrosion and at the same time has only a narrow region along the edge where the transition from metal-based functional layer to coating-free marginal region can be seen.

FIG. 2b shows a pane with a coating-free marginal region 4 and a protective layer 6 of width b, which are configured in three edge sections, 9.1, 9.2 and 9.3 of the circumferential pane edge 9 according to the present invention. No protective layer 6 is shown in edge section 9.4. Here, for example, a decoating can be effected according to the state of the art with a width of at least 10 mm, which is concealed by a cover imprintment or which is concealed by frame components after installation at its intended location. Such an embodiment is particularly suitable, for example, for a movable or a free-standing side pane of a vehicle, with which the lower edge disappears into the bodywork and therefore does not have to be designed in a visually attractive manner.

FIG. 3 shows a further embodiment of a glazing unit 10 according to the invention. The glazing unit is substantially the same as shown in FIG. 1. In addition, an emissivity-reducing coating 8 is disposed on the external surface IV of the second pane 2. It comprises a conductive ITO layer together with dielectric layers. The emissivity-reducing coating 8 on the second pane 2 further reduces the entry of thermal radiation into the interior. Thermal comfort is thus further increased in combination with the sun-protection coating 5 on the first pane 1. No coating-free marginal region is necessary on the second pane 2, since the emissivity-reducing coating 8 is not sensitive to corrosion.

FIG. 4 shows cross-sections of one embodiment of the glazing unit according to the invention during various stages of its manufacture.

Figure 4A:
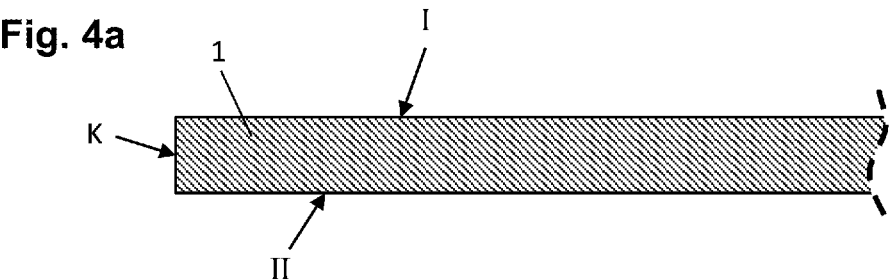
Figure 4B:
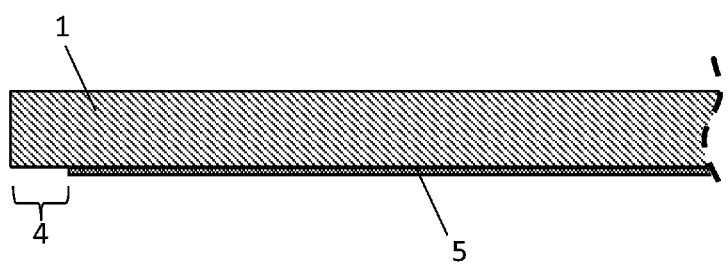
Figure 4C:
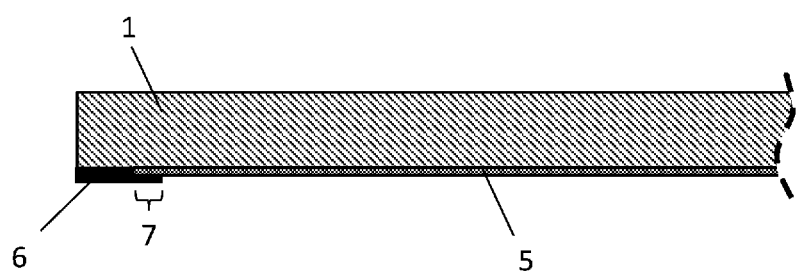
Figure 4D:
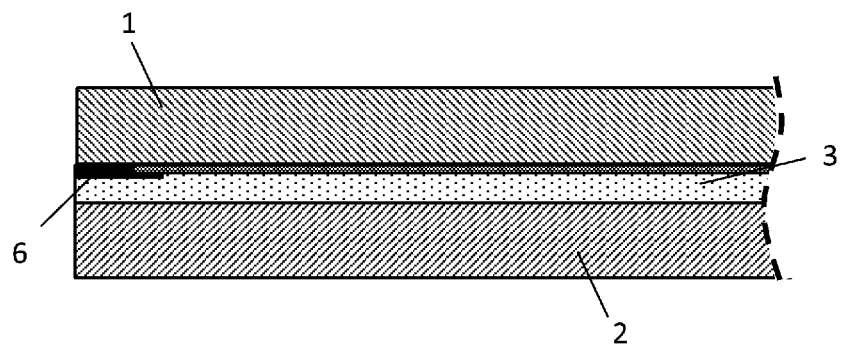

Initially, a first pane 1 is provided, which has a surface I intended to be an external surface and a surface II intended to be an internal surface and a circumferential side edge K (FIG. 4(a)). Next, a metal-based functional layer 5 is deposited over the entire surface II of the first pane 1, which is provided as the internal surface, by means of magnetic field-assisted cathode deposition (FIG. 4(b)). For example, the metal-based functional layer 5 is a sun-protection coating that reflects IR radiation and comprises the three silver layers. A coating-free marginal region 4 is created either by masking during the deposition process or, for example, by laser decoating after the deposition process. The coating-free marginal region 4 has a width e of 3 mm, for example. By means of screen printing, an opaque enamel is applied as a protective layer 6 on the metal-based functional layer 5 in the coating-free marginal region 4 and also in a 3 mm wide overlap region 7 (FIG. 4(c)). The enamel is then stoved on at temperatures of approximately 550° C. to 650° C. during the bending process of the pane. In a final step, the coated first pane 1 is connected to the second pane 2 and laminated via a thermoplastic intermediate layer 3, for example a 0.76 mm thick PVB layer (FIG. 4(d)).

LIST OF REFERENCE SIGNS

10 Glazing unit, motor vehicle pane
1 First pane, outer pane
2 Second pane, inner pane 3 Thermoplastic intermediate layer
4 Coating-free marginal region on an internal surface
5 Metal-based functional layer
6 Protective layer
7 Overlap region
8 Emissivity-reducing coating
9 Circumferential pane edge
9.1, 9.2, 9.3, 9.4 Edge sections of the pane
K Side edge of the first pane
I External surface of the first pane 1 facing away from the intermediate layer 3
II Internal surface of the first pane 1 facing the intermediate layer 3
III Internal surface of the second pane 2 facing the intermediate layer 3
IV External surface of the second pane 2 facing away from the intermediate layer 3

The invention claimed is:

1. A glazing unit comprising:
    a first pane and a second pane, which are connected to one another via a thermoplastic intermediate layer,
    a metal-based functional layer, which is deposited on an internal surface of the first pane facing the thermoplastic intermediate layer,
    a coating-free marginal region on the internal surface of the first pane, which is free of metal-based functional layer and extends from one side edge of the first pane over at least 1 mm to at most 5 mm on the internal surface, and
    a protective layer, which, in the coating-free marginal region, is disposed on the internal surface of the first pane and, in an overlap region directly adjoining the coating-free marginal region, is disposed on the metal-based functional layer,
    wherein the protective layer is a transparent oxide-containing coating.

2. The glazing unit according to claim 1, wherein the protective layer extends from the side edge of the first pane over 3 mm to 15 mm.

3. The glazing unit according to claim 1, wherein the glazing unit comprises a circumferential pane edge and the coating-free marginal region as well as the protective layer are disposed in sections along the circumferential pane edge or the coating-free marginal region as well as the protective layer extend circumferentially along the entire circumferential pane edge.

4. The glazing unit according to claim 1, wherein the transparent oxide-containing coating is a $SiO_xC_yH_z$ layer.

5. The glazing unit according to claim 4, wherein the enamel contains glass frits and/or mineral frits and optionally at least one pigment.

6. The glazing unit according to claim 1, wherein the protective layer is a SolGel layer, a PVD layer or a CVD layer.

7. The glazing unit according to claim 6, wherein the protective layer is an oxide-containing coating, which contains an oxide of at least one element selected from aluminum, silicon, titanium, zinc, zirconium, or tin.

8. The glazing unit according to claim 1, wherein the protective layer is in direct contact with the thermoplastic intermediate layer.

9. The glazing unit according to claim 1, wherein the metal-based functional layer comprises at least one metallic layer and is formed to reflect incident infrared light.

10. The glazing unit according to claim 1, wherein the glazing unit is a motor vehicle pane and the first pane is the outer pane and the second pane is the inner pane of the vehicle pane.

11. A method for manufacturing a glazing unit according to claim 1, comprising:
    providing a first pane, a second pane and a thermoplastic intermediate layer,
    applying a metal-based functional layer to the surface of the first pane provided as an internal surface,
    removing the metal-based functional layer in a marginal region extending from one side edge of the first pane over at least 1 mm to at most 5 mm,
    applying a protective layer in an overlap region directly adjoining the coating-free marginal region on the metal-based functional layer and in the coating-free marginal region on the surface of the first pane provided as an internal surface,
    treating the first pane at temperatures of 400° C.-700° C., and
    connecting the first pane and the second pane via the thermoplastic intermediate layer, such that the internal surface of the first pane faces the thermoplastic intermediate layer.

12. The method according to claim 11, wherein the protective layer is an oxide-containing coating, which is applied by SolGel coating, PVD coating, CVD coating, plasma-enhanced PVD coating or plasma-enhanced CVD coating.

13. The method according to claim 11, wherein the protective layer is an oxide-containing coating, which is applied by atmospheric plasma deposition.

14. The method according to claim 11, wherein the removal of the metal-based functional layer in the coating-free marginal region is carried out by mechanical decoating, laser decoating or removal of a masking layer applied during the application of the metal-based functional layer.

15. A method comprising providing a glazing unit according to claim 1 in a vehicle of transport for traffic on land, in the air or on water.

16. The glazing unit according to claim 2, wherein the protective layer extends from the side edge of the first pane over 5 mm to 10 mm.

17. The glazing unit according to claim 4, wherein the $SiO_xC_yH_z$ layer is formed by plasma polymerization of hexamethyldisiloxane.

18. The glazing unit according to claim 5, wherein the enamel contains glass frits and/or mineral frits based on oxides selected from boron, bismuth, zinc, silicon, aluminum and sodium.

19. The glazing unit according to claim 7, wherein the protective layer is an oxide of silicon or silicon oxide.

20. The glazing unit according to claim 9, wherein the at least one metallic layer is at least one silver layer.

* * * * *